(12) United States Patent
Sheretov et al.

(10) Patent No.: US 7,827,399 B1
(45) Date of Patent: Nov. 2, 2010

(54) CERTIFICATE PROCESSING

(75) Inventors: Andrei Sheretov, Campbell, CA (US);
Sunil C. Agrawal, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1142 days.

(21) Appl. No.: 11/191,491

(22) Filed: Jul. 27, 2005

(51) Int. Cl.
*H04L 29/06* (2006.01)

(52) U.S. Cl. ...................................... 713/156; 713/175

(58) Field of Classification Search ................. 713/168, 713/175, 176, 177, 178, 179, 155, 156
See application file for complete search history.

(56) References Cited

U.S. PATENT DOCUMENTS 6,321,333 B1* 11/2001 Murray ....................... 713/156
6,615,347 B1* 9/2003 de Silva et al. .............. 713/156
7,461,250 B1* 12/2008 Duane et al. ................ 713/157

OTHER PUBLICATIONS

Petra Wohlmacher, Digital Certificates: A survey of Revocation Methods, Nov. 2000, ACM, 1-58113-311-1.*
Liu et al. ,Visually Sealed and Digitally Signed Documents, Jan. 2004, Australian Computer Society, Inc. ,vol. 26.*

* cited by examiner

*Primary Examiner*—Ellen Tran
*Assistant Examiner*—Samuel Ambaye
(74) *Attorney, Agent, or Firm*—Robert C Kowert; Meyertons, Hood, Kivlin, Kowert & Goetzel, P.C.

(57) ABSTRACT

Briefly, an embodiment of a method of certificate path processing is disclosed, which includes the following. A certificate is accessed. A first set of preferences is searched. Various preferences correlated to the certificate are identified. The correlated preferences include a preference set which is digitally or logically compatible with the specific computing system performing the processing. The preferences correlating to the specific computing system are merged with another set of preferences to form a third preference set.

41 Claims, 4 Drawing Sheets

EMBODIMENT OF CERTIFICATE

CERTIFICATE PROCESSING

BACKGROUND

Certificates may comprise data structures that provide information usable during electronic transactions. For example, certificates may include identification data that may be utilized during the exchange of electronic data that may take place over a communications network, such as the Internet. In one example, certificates may be utilized when digitally signing an electronic document; for example. The certificate may be utilized to associate a computing system, application or user with an identity, such as a public key.

Processing a certificate may comprise performing one or more functions, such as digital signature functions, which may comprise digitally signing an electronic document. Additionally, processing a certificate may comprise utilizing a certificate to perform encryption functions, such as by use of the public key of a certificate, for example. Certificate processing may be performed based on a set of processing preferences. Such a set of preferences may be utilized to determine the manner of performing a particular function. Preferences may be determined by a computing system performing the function, for example. The preferences may vary based on particular functions being performed and/or the requirements of one or more of the parties of an electronic transaction.

DESCRIPTION OF THE DRAWING FIGURES

The subject matter regarded as claimed subject matter is particularly pointed out and distinctly claimed in the concluding portion of the specification. Claimed subject matter, however, both as to organization and method of function, together with objects, features, and advantages thereof, may best be understood by reference to the following detailed description when read with the accompanying drawings in which:

Figure 1:
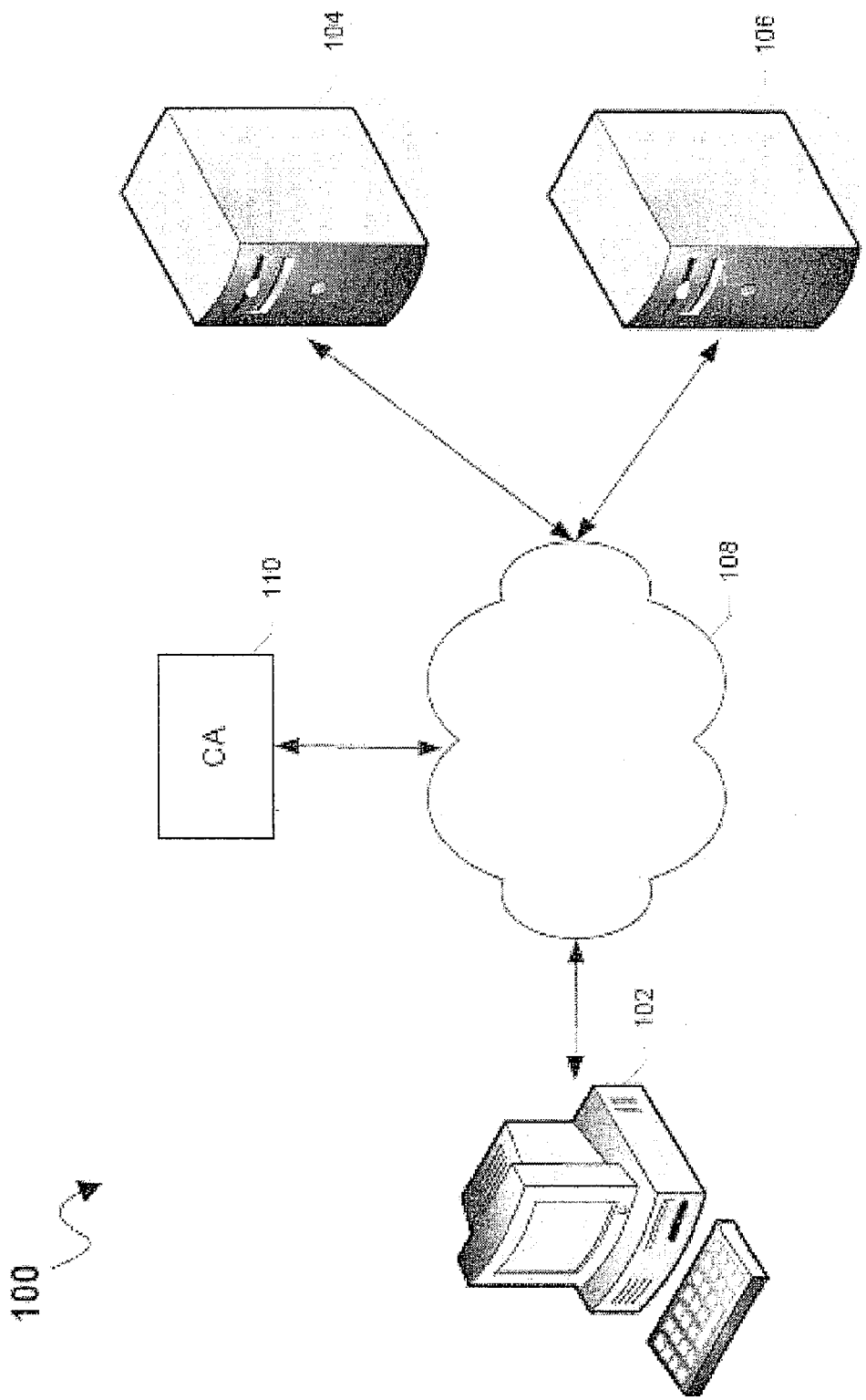
FIG. 1 is a schematic diagram of a system capable of performing certificate processing, in accordance with one or more embodiments.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail.

Some portions of the detailed description that follows are presented in terms of algorithms, programs or the like and/or symbolic representations of functions on data bits or binary digital signals within a computer memory. These algorithmic descriptions and representations may be the techniques used in the data processing arts to convey the arrangement of a computer system or other information handling system to operate according to the programs.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system or other information handling system.

Embodiments may include apparatuses or systems for performing the functions herein. This apparatuses or systems may be specially constructed for the desired purposes, or it may comprise a general purpose computing device selectively activated or configured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device or other information handling system. Various general purpose systems may be used with programs in accordance with the teachings herein, or it may prove convenient to construct a more specialized apparatus to perform the desired method. The desired structure for a variety of these systems will be apparent from the description below. In addition, embodiments are not described with reference to any particular programming language. It will be appreciated that a variety of programming languages may be used to implement the teachings of claimed subject matter as described herein.

In the following description and claims, words or terms that connote a conditional occurrence with respect to time, such as when or upon, may mean at a particular instant in time and may also mean near a particular instant in time and may include times preceding the instant in time and times subsequent to the instant in time, for example after a delay period from the particular instant in time. In addition, where a publicly available or commonly utilized standard is discussed, any one or more promulgated versions of the standard may be suitable for any one or more embodiments, and may include prior versions, current versions, and/or future adopted versions.

Certificates may be utilized during electronic transactions. Electronic transactions may involve the exchange of electronic data, and may include digitally signing an electronic document, encryption functions, authentication of identity, validation functions, and/or other types of transactions not explained in detail. Transactions such as these may take place over a communications network, such as the Internet. In particular embodiments, although the claimed subject matter is not limited in this respect, a certificate may comprise a data structure that includes one or more types of data. For example, a certificate may include electronic credentials that may be utilized to assert the identity of the user of a certificate during an electronic transaction. The electronic credentials may comprise a public/private key pair, for example. The electronic credentials may be utilized to perform certificate processing, which, in at least one embodiment, comprises performing one or more functions by utilizing one or more portions of a certificate. For example, a certificate may be utilized to digitally sign and/or encrypt an electronic document, and the process of digitally signing and/or encrypting an electronic document by utilizing the certificate may be referred to as certificate processing or certification processing. Although certificate processing may be generally discussed herein, additional details may be obtained from Request For Comments (RFC) 3280, "Internet X.509 public key infrastructure certificate and certificate revocation list (CRL) profile", which one portion of a family of standards for the X.509 public key infrastructure (PKI) for the Internet. Additionally, certificates utilized in at least one embodiment may comply with one or more versions of the X.509 standard, such as version 3 of the X.509 standard. Additional information may be obtained for one or more of these standards from the Internet Engineering Task Force (IETF), obtainable at the following web site address: http://www.ietf.org/.

Certificates may be utilized to perform digital signing and/or encryption, such as may be performed as part of an electronic transaction. However, it is worthwhile to note that the claimed subject matter is not so limited, and certificates in accordance with one or more embodiments may be utilized as part of authentication and/or verification functions, for example. In one embodiment, although the claimed subject matter is not so limited, a certificate may be utilized in the following manner: a request for a certificate may be provided to a certification authority (CA). The CA may verify the identity of the requesting entity and, in response to a verification of identity of the requesting entity, may create and/or provide the certificate to the requesting entity. The requesting entity may then utilize the certificate in electronic transactions. For example, a certificate may be utilized as part of a digital signature function. A digital signature function, in one embodiment, may be processed in the following manner: a message digest may be formed from the certificate. The message digest may be encrypted by using the private key of the certificate. The encrypted portion may comprise at least a portion of a digital signature. The digital signature may be decrypted and matched with the message digest of the certificate. However, this is just one example of certificate processing, and as mentioned previously, the claimed subject matter is not so limited.

Certificate processing may comprise performing one or more functions, as described previously. These functions may be performed based on a set of preferences. The set of preferences may comprise instructions for performing one or more functions, for example. Such a set of preferences may be based on one or more factors, such as based on a computing system performing the function, based on a certificate being utilized to perform the function, and/or based on a particular function being performed, for example. Preferences may be embodied on a computing system performing the function, and may comprise instructions for performing particular functions, such as the digital signature and/or encryption functions described above. These preferences may be referred to as certificate processing preferences. For example, in the above-described use of certificates, a digital signature function may be performed by using a certificate, and may be performed based on a set of certificate processing preferences, which may comprise instructions for performing the digital signature function. The set of preferences may include information such as location of a server to contact to check validity of the certificate, or whether a certificate must be time-stamped, as just a few examples. Additionally, certificate processing preferences may include digital signature criteria, such as if a certificate must be digitally signed as part of an electronic transaction; encryption criteria; revocation checking criteria; URL data of a server to contact for revocation and/or other data; timestamping criteria; acceptable policy object identifier (OID); archival criteria such as long term archival standards; and/or scoping data that may be utilized to determine the applicability of a preference to a particular function, such as which certificate(s) the preference should be applied to and/or when the preference(s) should be applied. However, these are just a few examples, and claimed subject matter is not so limited.

A computing system configured to perform certificate processing may have particular system settings. System settings may include settings of one or more components of the computing system, such as a display device, for example. Certificate processing may comprise performing one or more functions by use of a computing system, for example. As mentioned previously, these functions may be performed based on a set of certificate processing preferences. In addition to and/or alternatively, a function may be performed based on additional preferences, which may be referred to as system preferences. System preferences may comprise preferences of the computing system performing one or more functions by use of a certificate, for example. System preferences may comprise preferences of the computing system performing the certificate processing, such as configuration of one or more components of the computing system performing the processing. For example, a computing system may digitally sign an electronic document provided by another computing system as part of an electronic transaction. The computing system signing the electronic document may utilize a certificate to at least partially perform digital signing, such as in the manner described above. System preferences may specify zoom level of a display coupled to the computing system, wherein the display may be displaying a visual representation of the electronic document that is to be signed. Additionally, system preferences may specify contrast of the display; scrolling requirements of the display of the visual representation of the electronic document, such as a requirement that the visual representation of the document be scrolled completely before being digitally signed; limitations on the number and/or type of applications that may be executing on the computing system during signing, such as only trusted applications being executed and/or limitations on multimedia applications being executed during signing; system zoom level; contrast of a display; and/or page view criteria. However, these are just a few examples, and claimed subject matter is not limited to just these examples.

A computing system that may be capable of performing certificate processing may have stored thereon one or more certificate processing preferences that may be referred to as 'generic' preferences, in one embodiment. For example, a computing system may perform digital signature functions by use of certificates, and may perform this function based on a set of generic preferences, which may comprise preferences that may be generally applied by computing systems performing digital signature functions. The functions may be performed in a similar manner for all digital signature functions. It may be desirable to produce custom preferences, wherein the preferences may comprise certificate processing preferences and/or system preferences. The preferences may be based on attributes of a certificate being processed, and/or attributes of a computing system processing the certificate. Customized preferences may provide the capability to satisfy differing requirements of differing computing systems, such as when the requirements of one computing system for performing functions such as digitally signing a document may not accord with the preferences of another computing system validating the signed document, for example. However, forming custom preferences may be better understood with reference to the accompanying figures.

Referring now to FIG. 1, there is illustrated a schematic diagram of a system that may be employed to perform certificate processing. Illustrated in FIG. 1 is system 100. System 100 may comprise a plurality of devices 102, 104 and 106, which may be logically coupled by use of a communications network 108. Communications network 108 may at least partially employ the Internet, for example, and the devices may comprise a portion of a network or a subnetwork. System 100 may comprise a local area network, wide area network, Ethernet network and/or a token ring network, as just a few examples. Devices 102, 104 and 108 may be capable of exchanging data with one another, and the devices may include a modem, a network interface card or other component that may facilitate communication with one or more other devices according to one or more data protocols. Devices 102, 104 and 106 may comprise one or more types of computing systems, such as servers, personal computers, network blades, or hand held devices, for example. In one embodiment, device 102 may be referred to as a client, and devices 104 and 106 may comprise servers. Servers 104 and 106 may host web pages or perform other services, for example. Additionally, although not illustrated in detail, devices 102, 104 and 106 may include one or more processing units or processors, one or more input/output devices, such as a display, a keyboard and/or a mouse, a graphical user interface (GUI), and/or one or more types of memory, such as static random access memory, dynamic random access memory, flash memory, and/or a hard drive, for example.

In operation, one or more portions of system 100 may be capable of sending, receiving and/or processing certificates. Certificates may be provided from one device to another device, such as from servers 104 and/or 106 to client 102. Particular functions may be performed by using the certificates. In one example, client 102 may digitally sign an electronic document. The server may verify the certificate by performing one or more digital signature functions, which may additionally include performing verification of identity and/or revocation checking. These functions may be performed based on a set of preferences, such as certificate processing preferences and/or system preferences, such as described previously. Although referred to herein as a set of preferences, it is worthwhile to note that use of this terminology does not imply a particular number of preferences, and in one embodiment a set of preferences may comprise a single preference.

As stated previously, certificate processing may be carried out based on a set of preferences. The set of preferences may be identified by correlating a certificate with one or more preferences that may be digitally and/or logically represented on the computing system performing the processing, for example. Correlation may be performed by the sender and/or the receiver of a certificate. Correlation may be established in a number of ways and by use of one or more portions of a certificate, explained in more detail later. In one example, a client may digitally sign an electronic document. The server 104 may verify the digital signature by performing a verification of identity function. The server 104 may perform the verification of identity function based on a set of preferences. The set of preferences may comprise certificate processing preferences, such as instructions for performing verification of identity functions, and may be based on the particular certificate and/or the system performing the processing. In one embodiment, preferences may be correlated to the certificate when the certificate is received, the correlated preferences may be merged with other preferences, such as generic preferences, and a merged set of preferences may be formed. However, the manner of correlating preferences with certificates and performing functions based on the correlated preferences may be better understood with reference to FIG. 2, below.

Figure 2:
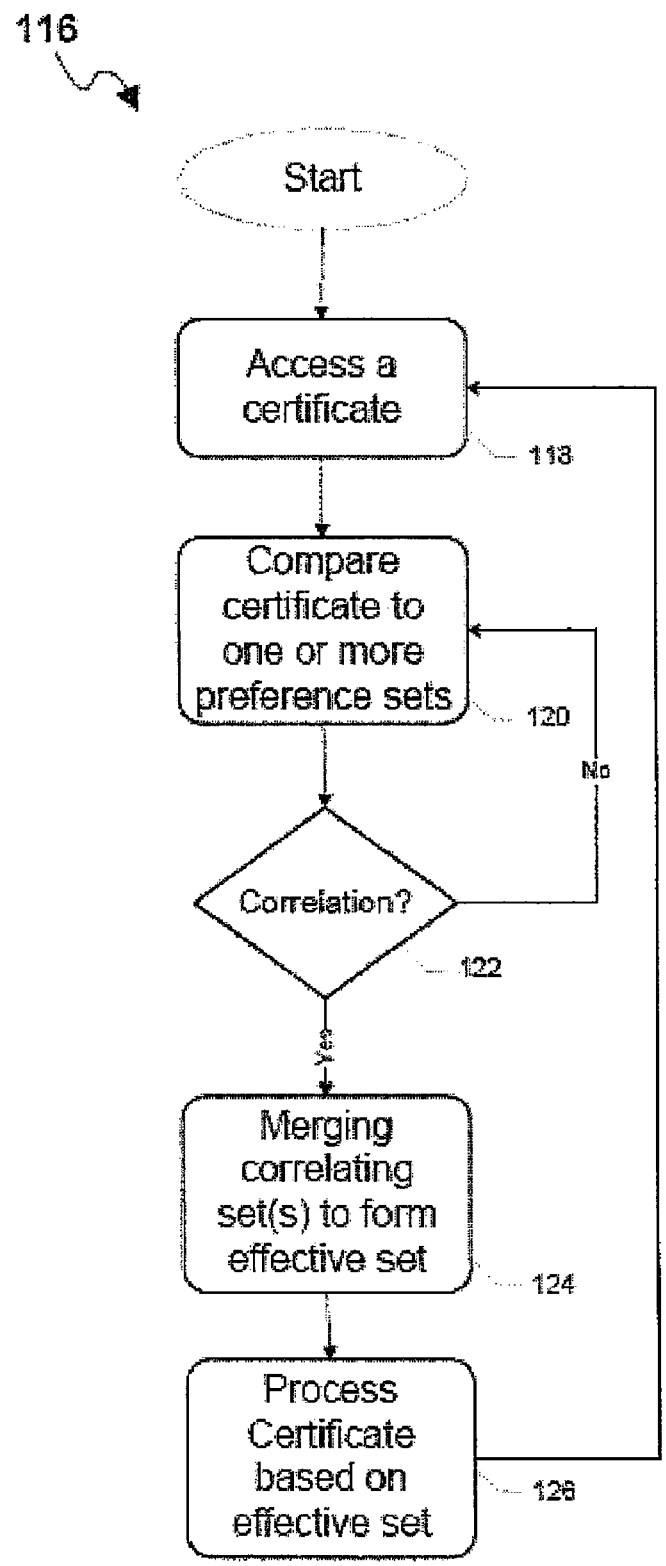
FIG. 2 is a flow diagram illustrating one embodiment of certificate processing.

Referring now to FIG. 2, one embodiment of a technique for performing certificate processing is illustrated by a process 116. However, for flow diagrams presented herein, the order in which the blocks are presented does not necessarily limit claimed subject matter to any particular order. Additionally, intervening blocks not shown may be employed without departing from the scope of claimed subject matter. Flow diagrams depicted herein may, in alternative embodiments, be implemented in a combination of hardware software and/or firmware, such as part of a computer system. In process 116, at block 118, a certificate may be accessed. Accessing a certificate may comprise a computing system receiving the certificate from another computing system, (e.g., over a network), or may comprise a computing system accessing a certificate from system memory, for example. At block 120, at least a portion of the certificate may be compared to one or more sets of preferences. The preferences may comprise certificate processing preferences and/or system preferences, for example. At block 122, a determination may be made regarding whether the certificate correlates with the one or more preference sets. If a correlation is found, at block 124, the correlating preference set(s) may be merged with one or more other preferences, such as generic preferences obtained from the computing system accessing the certificate to form a merged set of preferences. However, if no correlation is found, a feedback loop may initiate another comparison between the certificate and additional preferences. At block 126, after merging, the certificate may be processed. Processing, at block 126, may comprise performing one or more functions by use of the certificate. Processing, at block 126, may be performed based, at least in part, on the merged preferences, and may additionally be performed based on scoping data that may be included with the preferences, for example. A feedback loop may initiate a repeat of one or more of the functions of process 116 for additional certificates, such as for additional certificates. These functional blocks may be better understood when explained in more detail below.

A certificate accessed at block 118 may comprise a portion of a chain of certificates, such as a certificate in a chain of trust, which may be better understood with reference to RFC 3280, as described previously, although the claimed subject matter is not so limited. Accessing a certificate may comprise receiving a certificate, such as by one computing system sending a certificate to another computing system. In one embodiment a certificate may be received by a client computing system. The certificate may be provided in whole or in part to the computing system by one or more other computing systems, such as a server. The certificate may be provided by a client computing system, as described previously.

At block 120, one or more portions of the certificate may be compared to one or more preferences. The one or more portions may comprise an identifying portion of a certificate. Certificates may include one or more data fields, and one or more of the data fields may include identifying portions. For example, a hash of the public key found in the certificate, a subject distinguished name of the certificate, and/or one or more Object Identifiers (OIDs) that may be found in the certificate may be utilized to perform the comparison. These identifying portions will be explained in more detail with reference to FIG. 4. Comparing may comprise a comparison of an identifying portion of the certificate with one or more portions of one or more preferences, such as certificate processing preferences and/or system preferences. The one or more preferences may be stored on the computing system processing the certificate, but may additionally may be stored all or partially on one or more other computing systems. In one example, a certificate may include an identifying portion, and the identifying portion may be compared to an identifying portion of one or more preferences. The comparison may determine if there is a correlation. However, claimed subject matter is not so limited, and there is a plurality of ways by which to correlate preferences to certificates.

At block 122, a determination may be made about correlation between the preference(s) and the certificate. Correlation, in this context, may comprise a matching between identifying portions of a certificate and identifying portions of the preference(s), for example. If a correlation is found, the functions illustrated by block 124 may be performed. However, if a correlation is not found, the process may terminate, or the process may be at least partially repeated, and may be repeated by varying one or more of the certificate, the identifying portion, and/or the preferences, for example.

At block 124, the correlating preference(s) may be merged with one or more other sets of preferences to form a third set of preferences. In one embodiment, the third merged set of preferences may be referred to as an effective preference set. This set of preferences may be referred to in this manner because the set of preferences may be utilized to perform one or more functions by use of the certificate, for example. Additionally, the correlating preferences from block 122 may be referred to as a custom preference set formed based at least in part on a certificate, for example. However, use of the term 'custom' does not imply any particular data structure or content. The custom preference set may be merged with another preference set to form the effective preference set. The other preference set may be embodied on the computing system processing the certificate, but may additionally may be embodied all or partially on one or more other computing systems. The other preference set may be referred to as a default preference set. This set of preferences may be referred to in this manner because the preferences may be generally applicable to certificates such as the correlating certificate, and may not be customized for just this certificate, for example. However, again, use of this terminology does not imply any particular data structure or content. Merging the sets of preferences to form the effective preference set may comprise merging such that each portion of each set is integrated. However, in other embodiments, merging may comprise replacing portions of one set of preferences with another portion of another set of preferences, such as to form an integrated set of preferences that includes portions of each set, for example.

A certificate may be processed at block 126, based at least in part on the effective preference set. For example, the certificate may include one or more functions, such as digital signature and/or encryption functions. These functions may have numerous other functions as part of the primary function. For example, processing a certificate may comprise processing a digital signature function. When processing the digital signature function, the signature may have a time stamping requirement, or may involve revocation checking of the certificate. The merged preferences may include instructions for performing these functions. For example, the merged preferences may include a requirement that a digital signature be time stamped, or may provide location of a server to perform revocation checking of the certificate. These preferences may vary from the preferences that may be utilized for processing a certificate that does not correlate to a set of custom preferences, for example. Additionally, the effective preference set may be applied based at least in part on scoping data, which may determine when and/or where in the process the preferences will be applied. Scoping data may comprise a portion of the effective preference set, for example, and may include information utilized to determine when or where a particular portion of the preference set may be applied during certificate processing, for example.

Figure 3:
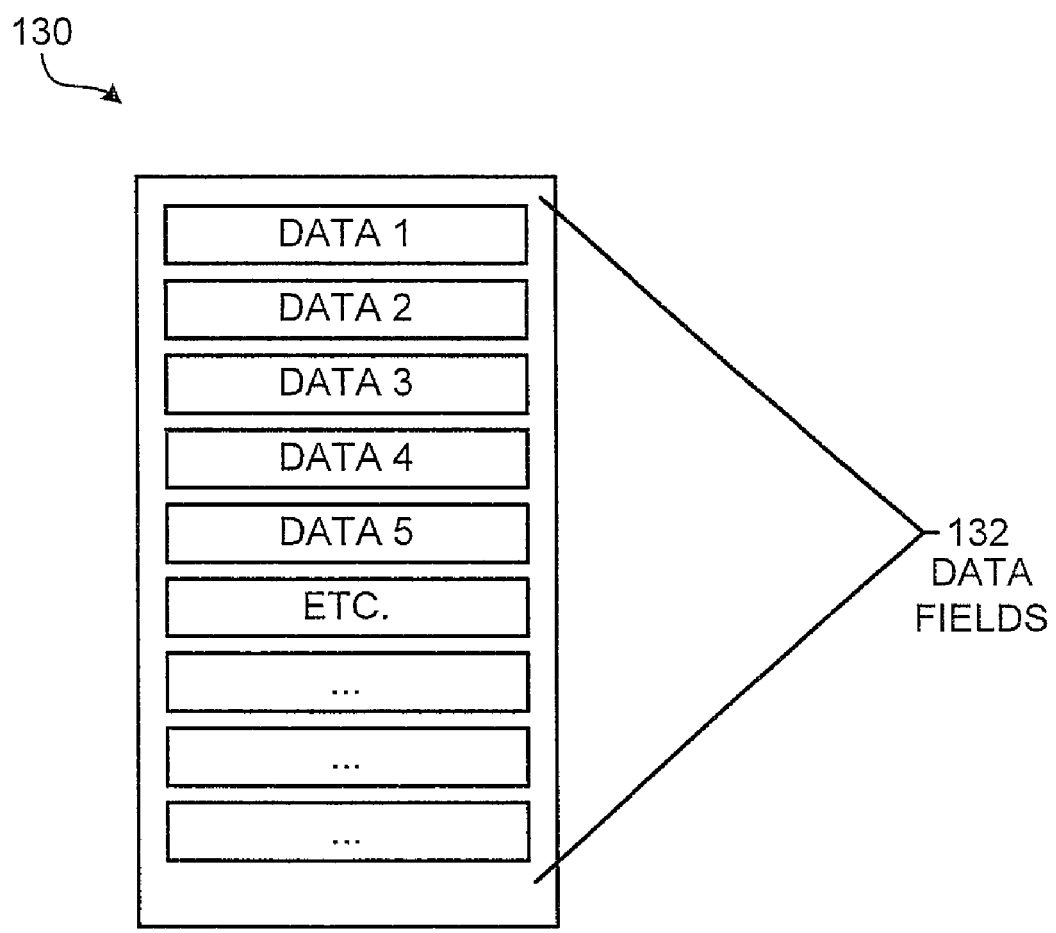
FIG. 3 is a schematic diagram of a certificate, in accordance with one or more embodiments.

Referring now to FIG. 3, there is illustrated a schematic diagram of a certificate, in accordance with one or more embodiments. Certificate 130 of FIG. 3 may comprise a X.509 certificate, as explained previously. Certificate 130 may be comprised of a plurality of data fields 132. Data fields 132 may include multiple types of data. For example, data fields 132 may include: certificate version, certificate serial number, issuer, validity period, public key information, digital signature, subject distinguished name, hash of the public key, scoping data and/or object identifier data. One or more of these data fields may be utilized to perform correlation functions, such as illustrated in FIG. 2. Certificate 130 may be a particular type or category of certificate, and may have a particular purpose such as to provide the capability of a computing system to perform digital signature and/or encryption functions. However, this is just one example of a certificate, and claimed subject matter is not so limited.

Figure 4:
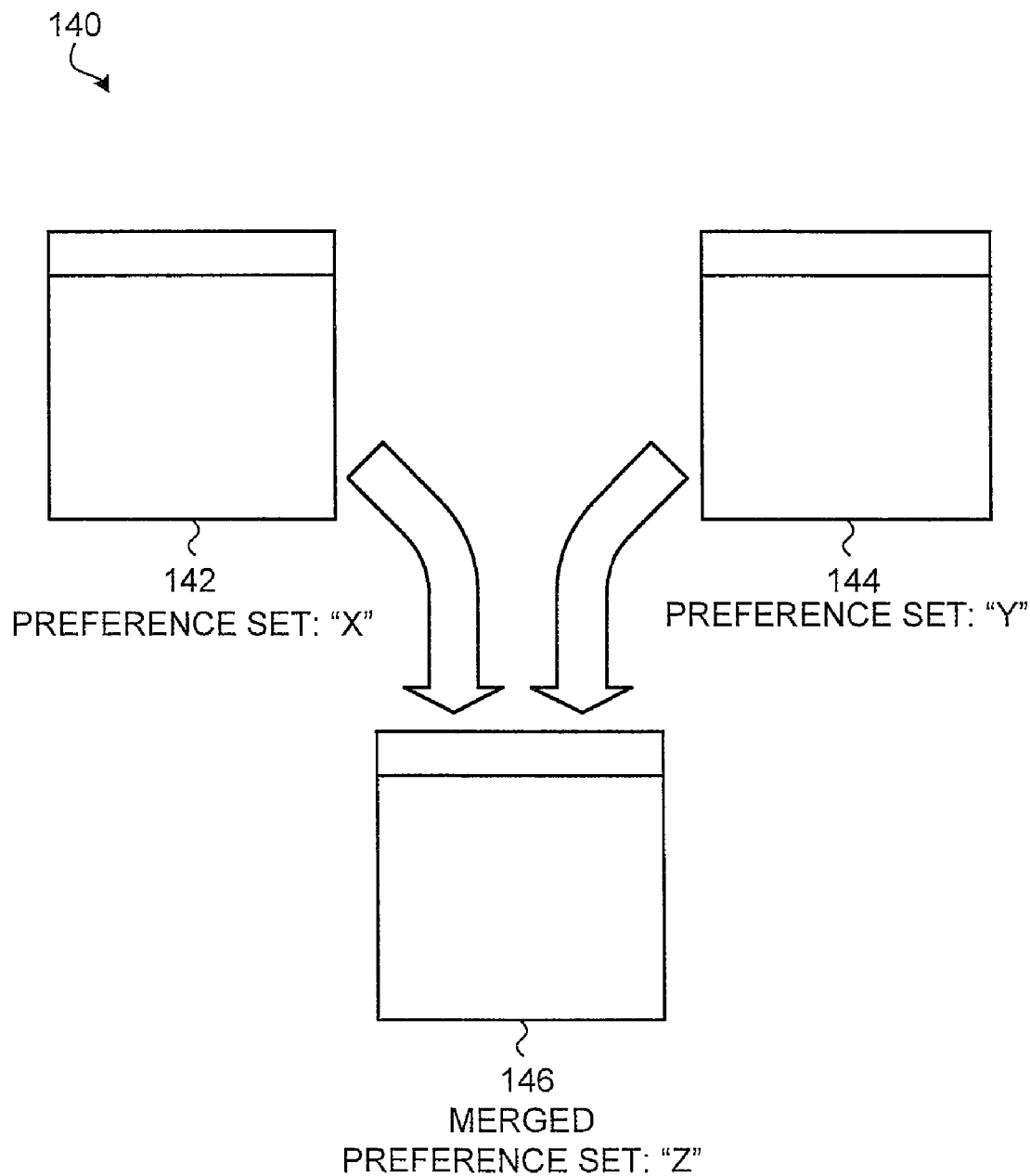
FIG. 4. is a block diagram illustrating a process of merging certificate processing preferences, in accordance with one or more embodiments.

Referring now to FIG. 4, there is illustrated a block diagram 140 illustrating a process of merging certificate processing preferences, in accordance with one or more embodiments. Illustrated in FIG. 4 are three sets of preferences 142, 144 and 146. In one embodiment, preference set 142 may comprise a default preference set. As explained previously, a default preference set may be represented on the computing system processing the certificate, but may additionally may be embodied all or partially on one or more other computing systems. The default preference set may be generally applicable to certificates such as the correlating certificate, and may not be customized for just this certificate, for example. In this embodiment, preference set 144 may comprise a custom preference set. As explained previously, custom preference set may comprise preferences that may be correlated to one or more identifying portions of a certificate, such as in the manner described with reference to FIG. 2. Custom preference set 144 may be represented on a computing system performing certificate processing, for example. In this embodiment, preference set 146 may comprise an effective preference set. Effective preference set 146 may comprise one or more portions of set 142 and set 144, and may be formed by merging portions of sets 142 and 144. Effective preference set may be utilized to at least partially process a certificate, such as in the following manner: a certificate may be received by a computing system. The certificate may be utilized to perform one or more functions, such as a digital signature function.

The computing system may have custom preferences 144 and default preferences 142 represented thereon. One or more default preferences 142 may be applicable to performing digital signature functions. The computing system may correlate one or more of the custom preferences 144 to the certificate. The correlating custom preferences 144 may be merged with the default preferences 142, to form merged preferences 146. The merged preferences 146 may comprise effective preferences, and may be utilized to perform the digital signature functions, at least in part. The merged preferences may include certificate processing preferences, such as digital signature requirements, revocation checking criteria, URL data of a server to contact for revocation and/or other data, acceptable policy object identifiers (OIDs), archival criteria such as long term archival standards and/or scoping data, for example. Additionally, the merged preferences may comprise system preferences, such as zoom level of a display coupled to the computing system, contrast of the display, scrolling requirements of the display, and limitations on the number and/or type of applications that may be executing on the computing system. However, these are just a few examples, and claimed subject matter is not limited to just these examples.

It is now appreciated, based at least in part on the foregoing disclosure, that a combination of hardware, software and/or firmware may be produced capable of performing one or more of the functions as described herein. It will additionally be understood that, although particular embodiments have just been described, claimed subject matter is not limited in scope to a particular embodiment or implementation. For example, a system capable of implementing one or more of the foregoing functions may comprise hardware, such as implemented to operate on a device or combination of devices, for example, whereas another embodiment may be in software and hardware, for example.

Likewise, an embodiment of a system capable of implementing one or more of the abovementioned functions may be implemented in firmware, or as any combination of hardware, software and/or firmware, for example. Additionally, all or a portion of one embodiment may be implemented to operate at least partially in one device, such as a display, a computing device, a cell phone, and/or a personal digital assistant (PDA), for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that, when executed by a system, such as a computer system, computing platform, a cell phone, a personal digital assistant (PDA), and/or other system, for example, may result in an embodiment of a method in accordance with claimed subject matter being executed, such as one of the embodiments previously described, for example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of certificate path processing, comprising:
    storing a given digital certificate;
    evaluating a first set of preferences to identify one or more preferences correlating to the given digital certificate; wherein the one or more correlating preferences are specific to the given digital certificate, wherein the one or more correlating preferences indicate a manner in which the one or more computers are to process the given digital certificate;
    subsequent to identifying the one or more correlating preferences, generating a combined set of preferences that includes at least a portion of the one or more correlated preferences that are specific to the given digital certificate combined with a second set of preferences that are not specific to said given digital certificate, wherein the second set of preferences indicates a manner in which the one or more computers are to process multiple digital certificates including the given digital certificate; wherein each set of preferences is distinct from each digital certificate; and
    processing the given digital certificate according to the combined set of preferences.

2. The method of claim 1, wherein the processing further comprises:
    determining scope for one or more portions of the combined set of preferences; and
    processing the preferences based at least in part on the determined scope.

3. The method of claim 2, wherein said determining scope further comprises accessing scoping data, wherein the scoping data comprises one or more data fields of the combined set of preferences.

4. The method of claim 1, wherein said identifying comprises:
    comparing a data field from the set of preferences with a data field from the given digital certificate; and
    determining that those data fields match.

5. The method of claim 4, wherein the data fields comprise one or more of:
    certificate identifier data, public key hash, subject distinguished name, and/or policy object identifier (OID).

6. The method of claim 1, wherein the given digital certificate adheres to X.509 public key infrastructure standard.

7. The method of claim 1, wherein the first set of preferences comprises a custom preference set.

8. The method of claim 1, wherein the second set of preferences comprises a default preference set.

9. The method of claim 1, wherein the combined set of preferences comprises an effective preference set.

10. The method of claim 1, wherein the combined set of preferences comprise certificate preferences.

11. The method of claim 10, wherein the certificate preferences comprise one or more of: digital signature criteria, encryption criteria, revocation checking criteria, URL data of a server, timestamping criteria, acceptable policy object identifier (OID), or archival criteria.

12. The method of claim 1, wherein the combined set of preferences comprises system preferences.

13. The method of claim 12, wherein the system preferences comprise one or more of: system zoom level, contrast, scrolling or page viewing criteria, and/or signing criteria.

14. The method of claim 1, wherein the given digital certificate comprises a digital certificate from a certificate path, and said storing, said evaluating and said processing are repeated for one or more digital certificates in the certificate path.

15. A machine-readable medium having stored thereon instructions that if executed perform a method, comprising:
    storing a given digital certificate;
    evaluating a first set of preferences to identify one or more preferences correlating to the given digital certificate; wherein the one or more correlating preferences are specific to the given digital certificate, wherein the one or more correlating preferences indicate a manner in which the one or more computers are process the given digital certificate;

subsequent to identifying the one or more correlating preferences, generating a combined set of preferences that includes at least a portion of the one or more correlated preferences that are specific to the given digital certificate combined with a second set of preferences that are not specific to said given digital certificate, wherein the second set of preferences indicates a manner in which the one or more computers are to process multiple digital certificates including the given digital certificate; wherein each set of preferences is distinct from each digital certificate; and processing the given digital certificate according to the combined set of preferences.

16. The machine-readable medium of claim 15, wherein the instructions, if executed, perform a method further comprising:

determining scope for one or more portions of the combined set of preferences; and processing the preferences based at least in part on the determined scope.

17. The machine-readable medium of claim 16, wherein determining scope comprises accessing scoping data, wherein the scoping data comprises one or more data fields of the combined set of preferences.

18. The machine-readable medium of claim 15, wherein said identifying comprises:

comparing a data field from the set of preferences with a data field from the given digital certificate; and determining that those data fields match.

19. The machine-readable medium of claim 18, wherein the data field comprises one or more of: certificate identifier data, public key hash, subject distinguished name, or policy object identifier (OID).

20. The machine-readable medium of claim 15, wherein the first set of preferences comprises a custom preference set.

21. The machine-readable medium of claim 15, wherein the second set of preferences comprises a default preference set.

22. The machine-readable medium of claim 15, wherein the combined set of preferences comprises an effective preference set.

23. The machine-readable medium of claim 15, wherein the combined set of preferences comprise certificate preferences, and includes one or more of: digital signature criteria, encryption criteria, revocation checking criteria, URL data of a server, timestamping criteria, acceptable policy object identifier (OID), or archival criteria.

24. The machine-readable medium of claim 15, wherein the combined set of preferences comprises system preferences, and includes one or more of: system zoom level, contrast, scrolling or page viewing criteria, or signing criteria.

25. The machine-readable medium of claim 15, wherein the given digital certificate comprises a digital certificate from a certificate path, and said storing, said evaluating and said processing are repeated for one or more digital certificates in the certificate path.

26. An apparatus, comprising:

means for storing a given digital certificate;

means for evaluating a first set of preferences to identify one or more preferences correlating to the given digital certificate; wherein the one or more correlating preferences are specific to the given digital certificate, wherein the one or more correlating preferences indicate a manner in which the given digital certificate is to be processed;

means for, subsequent to identifying the one or more correlating preferences, generating a combined set of preferences that includes at least a portion of the one or more correlated preferences that are specific to the given digital certificate combined with a second set of preferences that are not specific to said given digital certificate, wherein the second set of preferences indicates a manner in which multiple digital certificates including the given digital certificate are to be processed; wherein each set of preferences is distinct from each digital certificate; and means for processing the given digital certificate according to the combined set of preferences.

27. The apparatus of claim 26, wherein the means for processing further comprises:

means for determining scope for one or more portions of the combined set of preferences; and means for processing the preferences based at least in part on the determined scope.

28. The apparatus of claim 26, wherein the means for said identifying comprises:

means for comparing a data field from the set of preferences with a data field from the given digital certificate; and means for determining that those data fields match.

29. The apparatus of claim 28, wherein the data fields comprise one or more of:

certificate identifier data, public key hash, subject distinguished name, or policy object identifier (OID).

30. The apparatus of claim 26, wherein the given digital certificate adheres to X.509 public key infrastructure standard.

31. The apparatus of claim 26, wherein the combined set of preferences comprise certificate preferences, and includes one or more of: digital signature criteria, encryption criteria, revocation checking criteria, URL data of a server, timestamping criteria, acceptable policy object identifier (OID), or archival criteria.

32. The apparatus of claim 26, wherein the combined set of preferences comprises system preferences, and includes one or more of: system zoom level, contrast, scrolling or page viewing criteria, or signing criteria.

33. The apparatus of claim 26, wherein the given digital certificate comprises a digital certificate from a certificate path, and the means for said storing, means for said evaluating and means for said processing are repeated for one or more digital certificates in the certificate path.

34. An apparatus, comprising:

a computing system adapted to:

store a given digital certificate;

evaluate search a first set of preferences to find one or more preferences correlating to the given digital certificate; wherein the one or more correlating preferences are specific to the given digital certificate, wherein the one or more correlating preferences indicate a manner in which the computing system is to process the given digital certificate;

subsequent to identifying the one or more correlating preferences, generate a combined set of preferences that includes at least a portion of the one or more correlated preferences that are specific to the given digital certificate combined with a second set of preferences that are not specific to said given digital certificate, wherein the second set of preferences indicates a manner in which the computing system is to process multiple digital certificates including the given digital certificate; wherein each set of preferences is distinct from each digital certificate; and process the given digital certificate according to the combined set of preferences.

35. The apparatus of claim 34, the computing system further adapted to:
determine scope for one or more portions of the combined set of preferences; and
process the preferences based at least in part on the determined scope.

36. The apparatus of claim 34, wherein said identifying comprises:
compare a data field from the set of preferences with a data field from the given digital certificate; and
determine that those the data fields match.

37. The apparatus of claim 36, wherein the data fields comprise one or more of:
certificate identifier data, public key hash, subject distinguished name, or policy object identifier (OID).

38. The apparatus of claim 34, wherein the given digital certificate adheres to X.509 public key infrastructure standard.

39. The apparatus of claim 34, wherein the combined set of preferences comprise certificate preferences, and includes one or more of: digital signature criteria, encryption criteria, revocation checking criteria, URL data of the responder, timestamping criteria, acceptable policy object identifier (OID), or archival criteria.

40. The apparatus of claim 34, wherein the combined set of preferences comprises system preferences, and includes one or more of: system zoom level, contrast, scrolling or page viewing criteria, or signing criteria.

41. The apparatus of claim 34, wherein the given digital certificate comprises a digital certificate from a certificate path, and said storing, said evaluating and said processing are repeated by the computing system for one or more digital certificates in the certificate path.

* * * * *